(12) United States Patent
Ekstedt et al.

(10) Patent No.: US 8,014,342 B2
(45) Date of Patent: Sep. 6, 2011

(54) DATA SHARING AMONG RADIO ACCESS TECHNOLOGIES

(75) Inventors: Tomas Ekstedt, Lund (SE); Johan Hokfelt, Lund (SE); Jacob Lindquist, Lund (SE); Jan Wichert, Malmö (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 957 days.

(21) Appl. No.: 11/682,598

(22) Filed: Mar. 6, 2007

(65) Prior Publication Data

US 2008/0220778 A1 Sep. 11, 2008

(51) Int. Cl.
*H04W 4/00* (2009.01)
(52) U.S. Cl. ...... 370/328; 370/329; 455/450; 455/552.1
(58) Field of Classification Search ................ None
See application file for complete search history.

(56) References Cited

U.S. PATENT DOCUMENTS

| | | | |
|---|---|---|---|
| 5,734,980 A | 3/1998 | Hooper et al. | |
| 5,809,419 A | 9/1998 | Schellinger et al. | |
| 6,961,566 B2 | 11/2005 | Ida et al. | |
| 6,961,569 B2 | 11/2005 | Raghuram et al. | |
| 7,013,140 B2 | 3/2006 | Ostberg et al. | |
| 7,024,191 B2 * | 4/2006 | Ofuji et al. | 455/432.1 |
| 2002/0119774 A1 | 8/2002 | Johannesson et al. | |
| 2004/0137927 A1 | 7/2004 | Mun | |
| 2004/0224684 A1 * | 11/2004 | Dorsey et al. | 455/434 |
| 2004/0224689 A1 | 11/2004 | Raghuram et al. | |
| 2005/0043049 A1 | 2/2005 | Demir et al. | |
| 2005/0176426 A1 | 8/2005 | Roberts | |
| 2006/0009216 A1 | 1/2006 | Welnick et al. | |
| 2006/0040700 A1 | 2/2006 | Roberts et al. | |
| 2006/0068781 A1 | 3/2006 | Lam | |
| 2006/0264215 A1 | 11/2006 | Ekstedt et al. | |
| 2007/0082698 A1 * | 4/2007 | Su | 455/552.1 |
| 2007/0121552 A1 | 5/2007 | Lindoff | |
| 2008/0057959 A1 * | 3/2008 | Ida et al. | 455/435.1 |

FOREIGN PATENT DOCUMENTS

| EP | 1 641 293 A1 | 3/2006 |
|---|---|---|
| WO | 01/26409 A1 | 4/2001 |

OTHER PUBLICATIONS

3GPP Technical Specification (TS) 23.122 V7.5.0, Non-Access-Stratum (NAS) functions related to Mobile Station (MS) in idle mode, Release 7, Jun. 2006; Section 4.4.
3GPP Technical Specification (TS) 25.101 V7.4.0, User Equipment (UE) radio transmission and reception (FDD), Release 7, Jun. 2006, Section 5.
3GPP Technical Specification (TS) 45.005 V7.6.0, Radio Access Network: Radio transmission and reception, Release 7, Jun. 2006, Section 2.
Ericsson, On Inter-RAT Cell Reselection Principles, 3GPP TSG-RAN WG2 Meeting #57 Agenda Item 11.6.2, Feb. 12, 2007, pp. 1-4.
EPO, International Search Report in PCT/EP2008/051612, May 16, 2008, pp. 1-4.
EPO, Written Opinion in PCT/EP2008/051612, May 16, 2008, pp. 1-5.

* cited by examiner

*Primary Examiner* — Erika A Gary
(74) *Attorney, Agent, or Firm* — Potomac Patent Group PLLC (57) ABSTRACT

By adapting its search procedures, a user equipment in a mobile communication system can shorten the time needed to find a cell or public land mobile network. If a first cell in a first radio access technology has been found, the equipment can exclude one or more frequencies from a search for cells in a second radio access technology. Thus, time and power are not wasted searching for cells in the second radio access technology that cannot be found.

20 Claims, 4 Drawing Sheets

DATA SHARING AMONG RADIO ACCESS TECHNOLOGIES

BACKGROUND

This invention relates to communication systems and more particularly to wireless communication systems.

The number of frequency bands available for communication in mobile communication systems continues to increase, as does the amount of time needed for a user equipment (UE), such as a mobile phone or other remote terminal, to search for cells and public land mobile networks (PLMNs). In addition, increased search time requires increased power consumption in usually power-limited UEs.

Mobile communication systems include time-division multiple access (TDMA) systems, such as cellular radio telephone systems that comply with the GSM telecommunication standard and its enhancements like GPRS/EDGE, and code-division multiple access (CDMA) systems, such as cellular radio telephone systems that comply with the IS-95, cdma2000, and wideband CDMA (WCDMA) telecommunication standards. Digital communication systems also include "blended" TDMA and CDMA systems, such as cellular radio telephone systems that comply with the universal mobile telecommunications system (UMTS) standard, which specifies a third generation (3G) mobile system being developed by the European Telecommunications Standards Institute within the International Telecommunication Union's IMT-2000 framework. The Third Generation Partnership Project (3GPP) promulgates the UMTS and WCDMA standards.

3G mobile communication systems based on WCDMA as the radio access technology (RAT) are being deployed all over the world. High-speed downlink packet access (HSDPA) is an evolution of WCDMA that provides higher bit rates by using higher order modulation, multiple spreading codes, and downlink-channel feedback information. Another evolution of WCDMA is Enhanced Uplink (EUL), or High-Speed Uplink Packet Access (HSUPA), that enables high-rate packet data to be sent in the reverse, or uplink, direction.

New RATs are being considered for evolved-3G and fourth generation (4G) communication systems, although the structure of and functions carried out in such systems will generally be similar to those of earlier systems. In particular, orthogonal frequency division multiplexing is under consideration for evolved-3G and 4G systems.

This application focusses on WCDMA and GSM radio access technologies for simplicity of explanation, but it will be understood that the principles described in this application can be implemented in communication systems employing other RATs.

Cell and PLMN selection has a number of objectives, which include connecting a UE to the cell(s) and PLMN(s) that will provide the highest quality of service (QoS), enable the UE to consume the least power, and/or generate the least interference. Cell/PLMN selection is usually based on the signal strength (signal to interference ratio (SIR) or signal to noise ratio (SNR)) of candidate cells. For example, U.S. patent application Ser. No. 11/289,001 filed on Nov. 29, 2005, by B. Lindoff for "Cell Selection in High-Speed Downlink Packet Access Communication Systems" describes a cell selection process that takes into account the delay spread of the communication channel. U.S. Patent Application Publication No. US 2002/0119774 for "Method for PLMN Selection" by Johannesson et al. describes how a UE receives a list of data associated with networks neighboring the PLMN currently serving the UE from a base station (BS) of the PLMN currently serving the UE. A new PLMN to serve the UE can be selected based upon the list. U.S. Patent Application Publication No. US 2004/0224689 for "Method for a Radiotelephone to Scan for Higher Priority Public Land Mobile Network" by Raghuram et al. describes how a radiotelephone can scan for available frequencies that are in use and supported by higher priority PLMNs and the radiotelephone.

For 3GPP-compliant mobile communication systems, the PLMN selection process is specified in Section 4.4 of 3GPP Technical Specification (TS) 23.122 V7.5.0, Non-Access-Stratum (NAS) functions related to Mobile Station (MS) in idle mode (Release 7) (June 2006). At switch on, or following recovery from lack of coverage, the UE typically searches for the registered PLMN (RPLMN) or equivalent PLMN (if it is available) using all RATs that the UE is capable of, one RAT after another. All frequencies in all bands belonging to each RAT are searched for a measured signal strength, e.g., a received signal strength indicator (RSSI), above a RAT-specific search level. The search is done to determine which frequencies carry physical channels and which do not. If successful registration is achieved, the UE indicates the selected PLMN. If there is no RPLMN, or if registration is not possible, the UE follows either an automatic or a manual specified selection procedure, depending on its operating mode.

Today, the same geographic area is often served by two or more different RATs, e.g., WCDMA and GSM. Only a subset of the frequency bands supported by a RAT is typically used in a given geographic area, and one or more of the frequency bands of different RATs may overlap in part or completely. Frequencies that are valid for multiple RATs can carry physical channels of only one RAT at a time at a given geographic location. For all other RATs, the energies on those frequencies will be identified as noise.

According to Section 5 of 3GPP TS 25.101 V7.4.0, User Equipment (UE) radio transmission and reception (FDD) (Release 7) (June 2006) and Section 2 of 3GPP TS 45.005 V7.6.0, Radio Access Network; Radio transmission and reception (Release 7) (June 2006), the center frequencies of GSM and WCDMA frequency channels are denoted as Absolute Radio Frequency Channel Number (ARFCN) and UTRA Absolute Radio Frequency Channel Number (UARFCN), respectively. UTRA is an abbreviation of UMTS Terrestrial Radio Access, and UMTS is an abbreviation of Universal Mobile Telecommunications System. The frequency channels are typically placed on 200 kHz channel raster, which is common for both systems although WCDMA channels are 5 MHz wide and GSM channels are 200 kHz wide.

In some current UE implementations, a RAT device searches all frequency bands supported by a first RAT, e.g., WCDMA, and then switches to a second RAT, e.g., GSM, and searches again if no cell is found in the first search. For example, there are 300 shared frequency channels (ARFCNs/UARFCNs) in a 60-MHz-wide, shared frequency band. A typical scan for GSM cells involves searching an entire downlink frequency band to detect energy on each 200 kHz-wide channel, which may be indicated by a respective signal strength or RSSI. If energy is detected on a channel, a further search is performed in order to identify cell(s). If no GSM cell is actually present, the UE may spend a significant amount of time before this condition is recognized. Scans for WCDMA cells and cells of other RATs that may share the frequency band typically follow the same principles.

Thus, searching all possible physical channels of all RATs that the UE is capable of in overlapping parts of the frequency spectrum increases the total search time and power consumption of the UE, with clear negative impact on both battery life time and user perceived experience.

SUMMARY

In accordance with aspects of this invention, there is provided a method of searching for a cell in a communication system that includes the steps of searching for at least one cell in a first RAT; and if at least one cell is found by the searching step, adapting a search for a cell in a second RAT based on frequency information relevant to the found cell in the first RAT.

In accordance with further aspects of this invention, there is provided a UE for a communication system that includes a transceiver for communicating via a selected one of at least two RATs, and a processor, in communication with the transceiver, configured to search for at least one cell of the communication system using a first RAT. The processor is configured, if at least one cell is found, to adapt a search for a cell in a second RAT based on frequency information relevant to the found cell in the first RAT.

In accordance with further aspects of this invention, there is provided a computer-readable medium having stored instructions that, when executed by a processor, cause the processor to perform an adaptive method of searching for a cell in a communication system. The method includes searching for at least one cell in a first radio access technology; and if at least one cell is found by the searching step, adapting a search for a cell in a second radio access technology based on frequency information relevant to the found cell in the first radio access technology.

BRIEF DESCRIPTION OF THE DRAWINGS

The various objects, features, and advantages of this invention will be understood by reading this description in conjunction with the drawings, in which.

DETAILED DESCRIPTION

The inventors have recognized that GSM channels that are overlapped by found WCDMA cells need not be searched, and vice versa. This exclusion principle applies in general to other pairs, triplets, etc. of RATs, e.g., GSM and CDMA, GSM and 4G, etc. Thus, it is advantageous for a UE to prevent a RAT from searching for cells on frequencies on which another RAT has cells that have been found in order to save time and cut power consumption.

Figure 1:
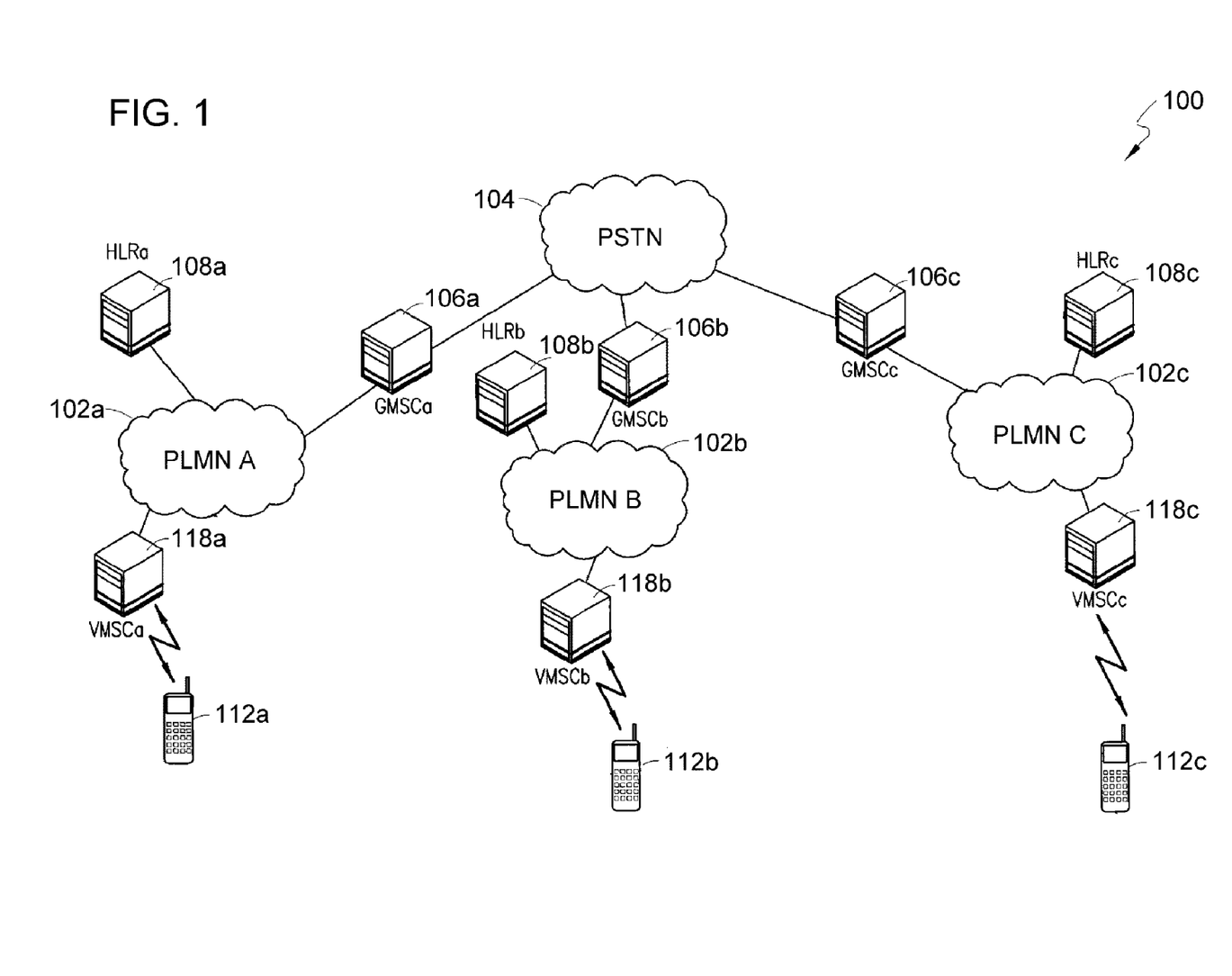
FIG. 1 is a diagram of an exemplary communication network.

FIG. 1 is a diagram of an exemplary mobile communication system 100 that includes a plurality of PLMNs 102a, 102b, 102c. It will be recognized that FIG. 1 depicts the PLMNs 102 as non-overlapping, but this is done only for clarity; in general, PLMNs can overlap to varying geographical extents. A conventional public switched telephone network (PSTN) 104 interfaces with the PLMNs through respective gateway mobile services switching centers (GMSCs) 106a, 106b, 106c. The PLMNs 102a, 102b, 102c have respective home location registers (HLRs) 108a, 108b, 108c. The HLRs maintain subscription data and keep track of the current locations of user equipments (UEs), such as mobile telephones or terminals, of the PLMNs' mobile subscribers, such as the UEs 112a, 112b, 112c.

For clarity, if the UE 112a subscribes to the PLMN 102a, the PLMN 102a is called the "home PLMN" of the UE 112a; in general, a home PLMN is a PLMN where the mobile country code (MCC) and mobile network code (MNC) of the PLMN identity are the same as the MCC and MNC of the UE. If the UE 112a roams to another PLMN 102b, 102c, then those PLMNs are called VPLMNs. A PLMN that provides services to a UE is called the UE's "serving PLMN", and occasionally the UEs initiate location registration procedures with respective VPLMN's visited mobile switching centers (VMSCs) 118a, 118b, 118c. The VMSCs inform the HLRs of the locations of the roaming mobile subscribers. For example, as UE 112a travels into the geographic area serviced by PLMN 102b, it registers with VMSC 118b, which informs HLR 108a of the current location of UE 112a.

The artisan will understand that the components and arrangement depicted in FIG. 1 are examples and should not be construed as limiting the components and arrangement of an actual communication system.

Figure 2:
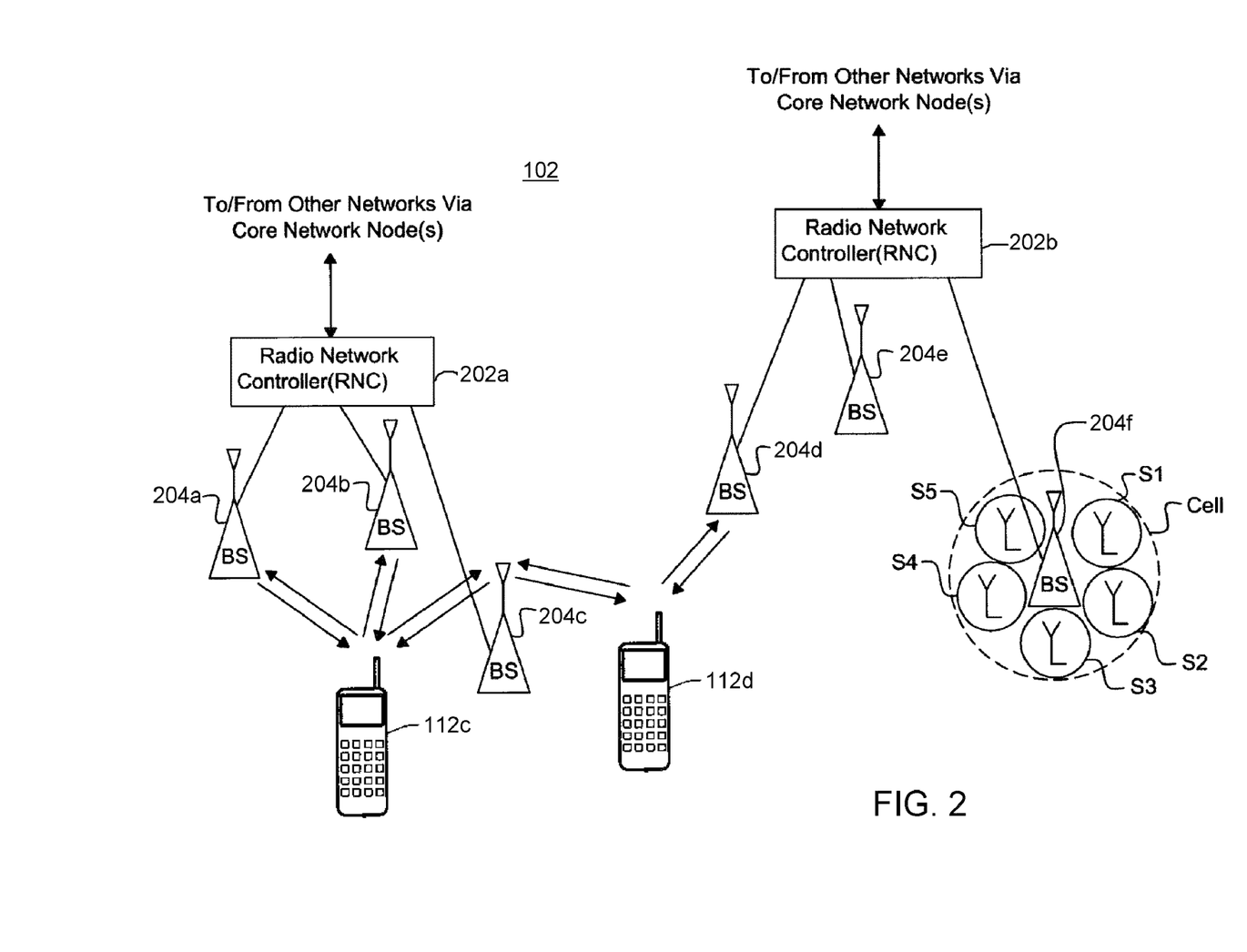
FIG. 2 depicts a public land mobile network (PLMN)

Each PLMN usually includes a respective number of base stations (not shown in FIG. 1) that are capable of communicating with the UEs. FIG. 2 depicts a PLMN 102, which may be, for example, a WCDMA communication system. Radio network controllers (RNCs) 202a, 202b control various radio network functions, including for example radio access bearer setup, diversity handover, etc. More generally, each RNC directs UE calls via the appropriate BSs, which communicate with UEs 112c, 112d through downlink (i.e., base-to-mobile, or forward) and uplink (i.e., mobile-to-base, or reverse) channels. RNC 202a is shown coupled to BSs 204a, 204b, 204c, and RNC 202b is shown coupled to BSs 204d, 204e, 204f. Each BS, which is called a Node B in 3GPP parlance, serves a geographical area that can be divided into one or more cell(s). BS 204f is shown as having five antenna sectors S1-S5, all or some of which can be said to make up the cell of the BS 204f. The BSs are coupled to their corresponding RNCs by dedicated telephone lines, optical fiber links, microwave links, etc. As described above, both RNCs 202a, 202b are connected with external networks such as the PSTN, the Internet, etc. through one or more core network nodes, such as an MSC and/or a packet radio service node (not shown).

Figure 3:
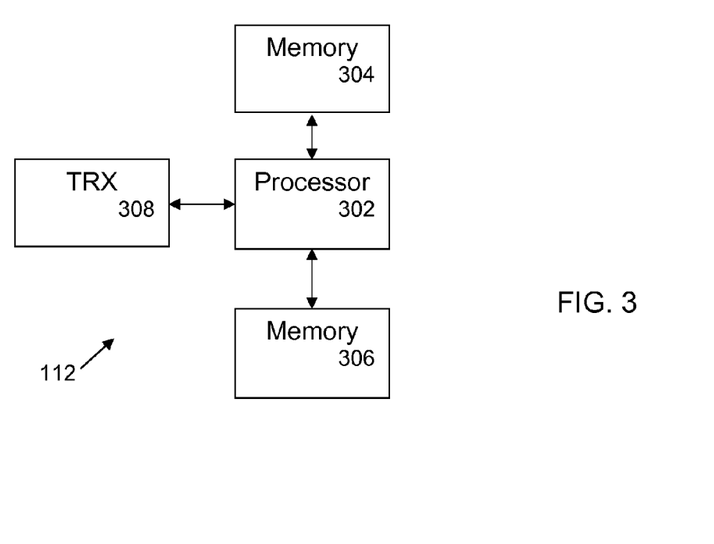
FIG. 3 is a block diagram of a user equipment.

FIG. 3 depicts a UE 112 that communicates through a wireless link with a BS 204 of a PLMN 102. The 112 UE determines what type of radio carrier, or RAT (e.g., UMTS, including GSM and WCDMA, GSM COMPACT, etc.), to search for when attempting to select a specific PLMN. Information transmitted from the BS 204 to the UE 112 enables the UE 112 to select the PLMN and may be stored in a suitable memory or memories in the UE 112. The information may either be transmitted by the BS 204 on a suitable broadcast channel or selectively transmitted to the UE 112, for example, during registration of the UE with the serving PLMN. Those of skill in the art will understand that the transmitted information that enables the UE 112 to select the PLMN includes, but is not necessarily limited to, a PLMN identification (ID), which is typically broadcast by each cell. Some UEs may compare such transmitted PLMN IDs to PLMN IDs stored on the UEs' SIM cards.

Among other things, the UE 112 includes one or more programmable processors 302 or suitable logic that processes information stored in one or more memories 304, 306. The stored information may include, among other things, RAT and/or frequency placement of previously found cells, which a processor 302 can use in searching for cells and selecting PLMNs. It will be appreciated that the processor 302 typically includes timers, etc. that facilitate its operations. Transceiver (TRX) circuitry 308 provides for the reception and transmission of control and traffic signals on the link between the UE 112 and the BS 204. Similarly suitable transceiver circuitry is provided in the BS 204. The TRX 308 includes frequency-selective components that operate under the control of the processor 302 and determine the RAT used by the UE 112 to communicate with the BS 204. Among other things, the TRX 308 produces down-converted and decoded information, e.g., frequency correction bursts (FBs) and data symbols, which the processor 302 can use to determine the current RAT and to handle information for different RATs.

The conventional PLMN selection procedure carried out in a UE, e.g., by the processor 302, involves scanning for available PLMNs; selecting the highest prioritized available PLMN; and searching for cells and selecting a cell in the selected PLMN. The searching typically includes all frequency bands and RATs supported by a UE.

Figure 4:
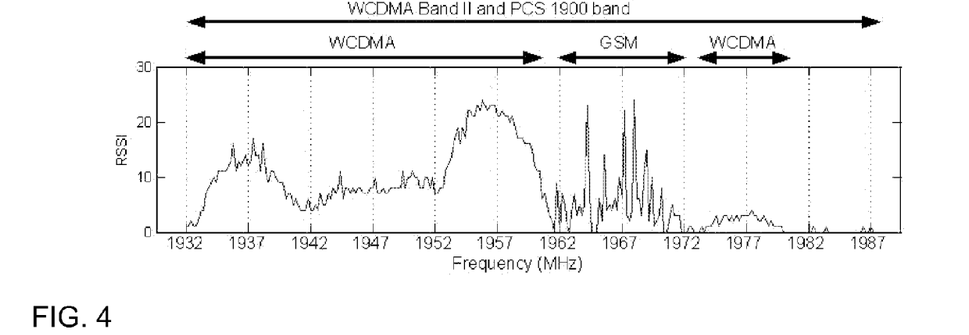
FIG. 4 depicts frequency bands used for different radio access technologies.

For example, the PCS 1900 band and WCDMA Band II are allocated the same uplink (1850-1910 MHz) and downlink (1930-1990 MHz) frequencies, and in some geographic areas, parts of these frequency bands are used for GSM (PCS) systems and other parts for WCDMA systems. This is illustrated by FIG. 4, which depicts an RSSI scan (in arbitrary units) in the frequency spectrum between 1932 MHz and 1987 MHz, with a GSM system operating in the frequency band of 1962-1972 MHz and a WCDMA system operating in the frequency bands of 1932-1960 MHz and 1972-1980 MHz. Because there are 300 possible frequency channels (ARFCNs/UARFCNs) in a 60-MHz-wide, shared frequency band such as that illustrated by FIG. 4, a UE may spend significant time and energy on searching for non-existent cells, with clearly negative impact on both battery life time and user perceived experience.

As described above, the inventors have recognized an exclusion principle that saves UE search time and energy. In one implementation of the principle, GSM channels that are overlapped by found WCDMA cells need not be searched, and vice versa, and thus a GSM-and-WCDMA-capable UE does not search for cells of a RAT on frequencies on which another RAT has cells that have been found. With channel spacing of 5 MHz in WCDMA and 0.2 MHz in GSM, the UE's processor 302 can exclude up to 25 ARFCNs in a GSM cell search for each WCDMA UARFCN that was found in a prior WCDMA cell search. Similarly, the UE can exclude in a WCDMA cell search up to 25 UARFCNs surrounding each ARFCN on which GSM cells were detected in a prior GSM cell search.

It is currently believed to be preferable for the UE to exclude frequencies that are within half the channel width of a found channel because channels usually do not interfere if they do not overlap. In the example depicted in FIG. 4, this means that once the UE finds the WCDMA cell at 1956 MHz, the UE does not search in the GSM RAT within 2.5 MHz of 1956 MHz. Similarly, once the UE finds the GSM cell at 1967 MHz, the UE does not search in the WCDMA RAT within 2.5 MHz of the 1967 MHz. Other arrangements are possible, of course. For example, the UE could exclude only frequencies that are within less than half a channel width of a found channel, although doing so risks searching more frequencies that will not have cells. The particular numbers of carrier frequencies that are excluded depend on both the found cell's bandwidth and the searched cell's bandwidth. The carrier frequencies that are excluded depend on system implementation and can be readily determined from experience.

In accordance with features of this invention, the conventional cell/PLMN selection procedure is modified as described below and as depicted by the flow chart of FIG. 5. In step 502, a cell search is conducted in a first RAT. If the search in the first RAT (e.g., GSM) has found at least one cell (Yes in step 504), frequency information relevant to the found cell (for example, the ARFCN or equivalent information) is made available (step 506) to the UE's processor, which uses the information to adapt a cell search in a second RAT (e.g., WCDMA) (step 508). If the search in the first RAT has not found a cell (No in step 504), a non-adapted, or conventional, cell/PLMN search in the second RAT can be conducted (step 510). Whether or not a cell is found by the search in the second RAT is determined (step 512), and the process flow continues (step 514) conventionally.

A UE typically can decide that it has found a cell in several ways that may depend on the RAT, but in general the decision is based on whether the UE can properly decode information transmitted in the cell. In a GSM cell, for example, the UE determines whether the RSSI has crossed a threshold, and if so, the UE tries to decode a frequency correction burst (FCB). If the FCB is decoded properly, the UE tries to decode the synchronization channel, and if that is decoded properly, then the UE tries to decode the broadcast system information, which includes the PLMN ID, among other things. If the UE decodes all properly, the UE has found a GSM cell.

Figure 5:
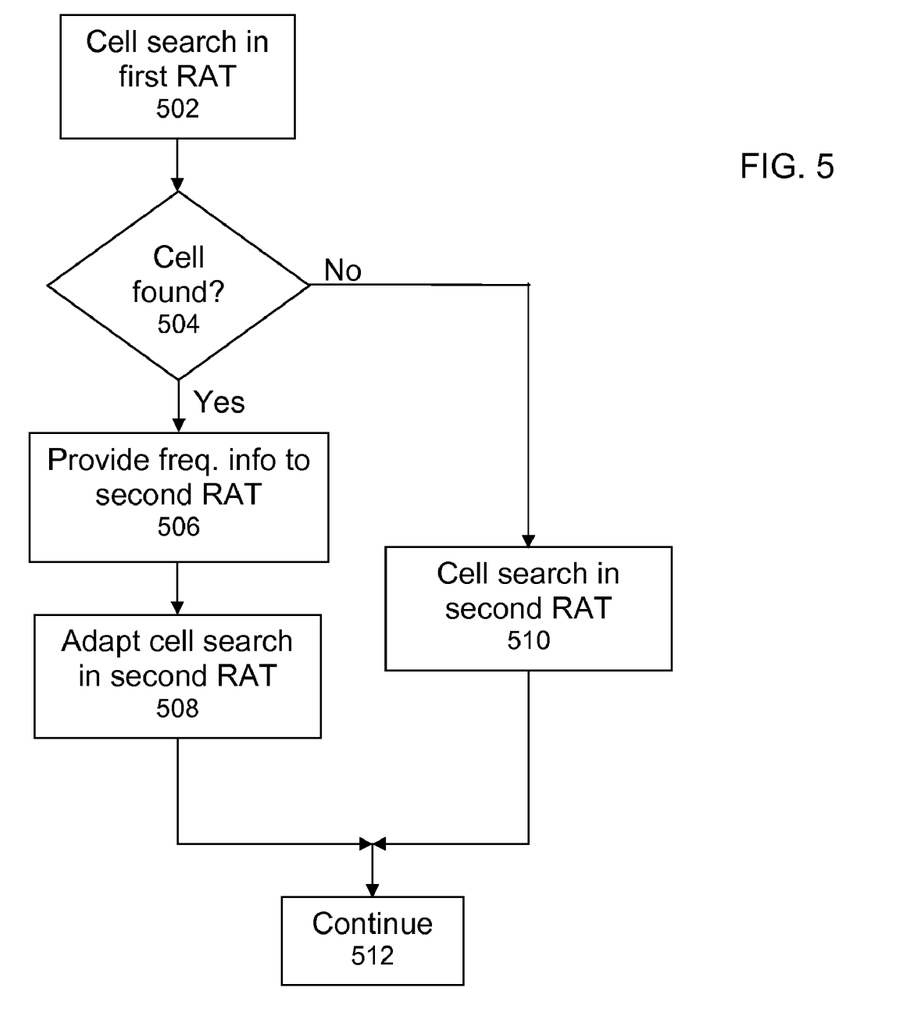
FIG. 5 is a flow chart of an improved method of searching for a cell or PLMN.

In one implementation of the method depicted by FIG. 5, the UE's processor 302 is configured such that it manipulates data arranged in a plurality of stacks maintained in one or more of the memories 304, 306. In general, the processor 302 attempts to find cells on respective carrier frequencies by arranging received information in order of received signal strength and attempting to decode the information received. If decoding is successful, the processor 302 has found a cell on the respective carrier frequency. Thus, when a first stack, corresponding to a first RAT, has data on a found cell, that cell's frequency information is forwarded to a second stack, corresponding to a second RAT. When a cell search is started in the second RAT, corresponding UARFCNs or ARFCNs or equivalent parameters are identified as partly overlapped by cells found by the first RAT, and such UARFCNs or ARFCNs are excluded from the cell search in the second RAT. As described above, a cell found on a WCDMA UARFCN excludes from a GSM cell search all GSM ARFCNs covered by the WCDMA UARFCN up to, for example, +/−2.5 MHz, and a cell found on a GSM ARFCN excludes from a WCDMA cell search all WCDMA UARFCNs corresponding to the GSM ARFCN center frequency up to, for example, +/−2.5 MHz.

It should be understood that rather than adapting a WCDMA cell search based on finding even one GSM cell, it can be advantageous to adapt the WCDMA search, excluding one or more UARFCNs, only after other conditions are met. For example, a search in a second RAT can be adapted after finding a threshold number of cells of a first RAT in a portion of a frequency band, which is to say, a certain spectral density (which may be given in terms of frequency separation and/or combined energy per MHz). For another example, a search can be adapted after finding a particular accumulated signal energy in a portion of a frequency band. It will be appreciated that the processor 302 can determine the accumulated signal energy in a number of ways, for example by summing measured values of signal strengths or RSSIs. This accommodates communication systems in which single narrow-width cells, such as GSM cells, co-exist with wide cells, such as WCDMA cells, on the same frequency in some geographic areas. In such systems, it is currently believed to be undesirable to prevent a UE from finding a sought wide cell after finding a single narrow-width cell.

In some RAT-band combinations, one RAT's downlink frequencies can overlap the other RAT's uplink frequencies. Thus, such combinations can be recognized by the UE and then both the downlink and corresponding uplink frequencies can be provided to the other RAT to evaluate if either or both overlap partly in any band.

Among the advantages of this invention are that cell search and PLMN scan time and power consumption will be reduced because radio usage is reduced. The cell search time is of great interest for communication system operators, which typically want a UE to camp on a suitable cell as soon as possible after power on. Shortened PLMN scans can also be important when searching for a suitable PLMN in limited-service (e.g., emergency calls only) states. Reduced power consumption is of particular value, especially when the UE may perform repeated scans.

It is expected that this invention can be implemented in a wide variety of environments, including for example mobile communication devices. It will be appreciated that procedures described above are carried out repetitively as necessary. To facilitate understanding, many aspects of the invention are described in terms of sequences of actions that can be performed by, for example, elements of a programmable computer system. It will be recognized that various actions could be performed by specialized circuits (e.g., discrete logic gates interconnected to perform a specialized function or application-specific integrated circuits), by program instructions executed by one or more processors, or by a combination of both. Many communication devices can easily carry out the computations and determinations described here with their programmable processors and application-specific integrated circuits.

Moreover, the invention described here can additionally be considered to be embodied entirely within any form of computer-readable storage medium having stored therein an appropriate set of instructions for use by or in connection with an instruction-execution system, apparatus, or device, such as a computer-based system, processor-containing system, or other system that can fetch instructions from a medium and execute the instructions. As used here, a "computer-readable medium" can be any means that can contain, store, or transport the program for use by or in connection with the instruction-execution system, apparatus, or device. The computer-readable medium can be, for example but not limited to, an electronic, magnetic, optical, electromagnetic, infrared, or semiconductor system, apparatus, or device. More specific examples (a non-exhaustive list) of the computer-readable medium include an electrical connection having one or more wires, a portable computer diskette, a RAM, a ROM, an erasable programmable read-only memory (EPROM or Flash memory), and an optical fiber.

Thus, the invention may be embodied in many different forms, not all of which are described above, and all such forms are contemplated to be within the scope of the invention. For each of the various aspects of the invention, any such form may be referred to as "logic configured to" perform a described action, or alternatively as "logic that" performs a described action.

It is emphasized that the terms "comprises" and "comprising", when used in this application, specify the presence of stated features, integers, steps, or components and do not preclude the presence or addition of one or more other features, integers, steps, components, or groups thereof.

The particular embodiments described above are merely illustrative and should not be considered restrictive in any way. The scope of the invention is determined by the following claims, and all variations and equivalents that fall within the range of the claims are intended to be embraced therein.

What is claimed is:

1. An adaptive method of searching for a cell in a communication system, comprising the steps of:
   searching for at least one cell in a first radio access technology, the cell being one of a plurality of cells having respective predetermined frequency channels in a band in the first radio access technology; and
   if at least one cell is found by the searching step, adapting a search for a cell in a second radio access technology based on frequency information relevant to the found cell in the first radio access technology;
   wherein the first radio access technology is different from the second radio access technology, and adapting the search for a cell in the second radio access technology comprises excluding, irrespective of respective priorities of cells in the first and second radio access technologies, at least one predetermined frequency channel of the second radio access technology that overlaps the frequency channel of the found at least one cell in the first radio access technology and including a predetermined frequency channel of at least one other cell in the band in the first radio access technology.

2. The method of claim 1, wherein whether a cell is found is determined by comparing a signal strength on a frequency channel with a threshold and successfully decoding information received on the frequency channel.

3. The method of claim 2, wherein different radio access technologies have different thresholds.

4. The method of claim 1, wherein the frequency information comprises an absolute radio frequency channel number.

5. The method of claim 1, wherein the search for a cell in the second radio access technology is adapted only if, in at least a portion of a frequency band used by the first radio access technology, at least one of a particular number of cells and a particular accumulated signal energy is found.

6. The method of claim 1, wherein adapting the search for a cell in the second radio access technology comprises excluding from the search at least a center frequency of the cell found in the first radio access technology.

7. The method of claim 6, wherein a plurality of frequencies are excluded from the search for a cell in the second radio access technology.

8. A user equipment (UE) for a communication system, comprising:
   a transceiver configured for communication via a selected one of at least two radio access technologies (RATs); and
   a processor, in communication with the transceiver, configured to search for at least one cell of the communication system using a first RAT, the cell being one of a plurality of cells having respective predetermined frequency channels in a band in the first radio access technology, and if at least one cell is found, to adapt a search for a cell in a second RAT based on frequency information relevant to the found cell in the first RAT;
   wherein the first RAT is different from the second RAT, and the processor is configured to adapt the search for a cell in the second RAT by excluding, irrespective of respective priorities of cells in the first and second RATs, at least one predetermined frequency channel of the second RAT that overlaps the frequency channel of the found at least one cell in the first RAT and including a predetermined frequency channel of at least one other cell in the band in the first radio access technology.

9. The UE of claim 8, wherein the processor determines whether a cell is found by comparing a signal strength on a frequency channel with a threshold and successfully decoding information received on the frequency channel.

10. The UE of claim 9, wherein different radio access technologies have different thresholds.

11. The UE of claim 8, wherein the frequency information comprises an absolute radio frequency channel number.

12. The UE of claim 8, wherein the processor adapts the search for a cell in the second RAT only if, in at least a portion of a frequency band used by the first RAT, at least one of a particular number of cells and a particular accumulated signal energy is found.

13. The UE of claim 8, wherein the processor is configured to manipulate data arranged in a plurality of stacks, and the first and second RATs have respective corresponding stacks.

14. A non-transitory computer-readable medium having stored instructions that, when executed by a processor, cause the processor to perform an adaptive method of searching for a cell in a communication system, the method comprising the steps of:
  searching for at least one cell in a first radio access technology, the cell being one of a plurality of cells having respective predetermined frequency channels in a band in the first radio access technology; and
  if at least one cell is found by the searching step, adapting a search for a cell in a second radio access technology based on frequency information relevant to the found cell in the first radio access technology;
  wherein the first radio access technology is different from the second radio access technology, and adapting the search for a cell in the second radio access technology comprises excluding, irrespective of respective priorities of cells in the first and second radio access technologies, at least one predetermined frequency channel of the second radio access technology that overlaps the frequency channel of the found at least one cell in the first radio access technology and including a predetermined frequency channel of at least one other cell in the band in the first radio access technology.

15. The medium of claim 14, wherein whether a cell is found is determined by comparing a signal strength on a frequency channel with a threshold and successfully decoding information received on the frequency channel.

16. The medium of claim 15, wherein different radio access technologies have different thresholds.

17. The medium of claim 14, wherein the frequency information comprises an absolute radio frequency channel number.

18. The medium of claim 14, wherein the search for a cell in the second radio access technology is adapted only if, in at least a portion of a frequency band used by the first radio access technology, at least one of a particular number of cells and a particular accumulated signal energy is found.

19. The medium of claim 14, wherein adapting the search for a cell in the second radio access technology comprises excluding from the search at least a center frequency of the cell found in the first radio access technology.

20. The medium of claim 19, wherein a plurality of frequencies are excluded from the search for a cell in the second radio access technology.

* * * * *

UNITED STATES PATENT AND TRADEMARK OFFICE
CERTIFICATE OF CORRECTION

Page 1 of 1

PATENT NO. : 8,014,342 B2
APPLICATION NO. : 11/682598
DATED : September 6, 2011
INVENTOR(S) : Ekstedt et al.

It is certified that error appears in the above-identified patent and that said Letters Patent is hereby corrected as shown below:

In Fig. 3, Sheet 3 of 4, delete "  " and insert --  --, therefor.

In Column 2, Line 47, delete "on" and insert -- on a --, therefor.

Signed and Sealed this
Thirty-first Day of July, 2012

David J. Kappos
*Director of the United States Patent and Trademark Office*